United States Patent
Sasaki et al.

(10) Patent No.: US 6,633,400 B1
(45) Date of Patent: Oct. 14, 2003

(54) PRINT SYSTEM

(75) Inventors: Hiroyuki Sasaki, Nagoya (JP); Keiji Miyake, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/239,719

(22) Filed: Jan. 29, 1999

(30) Foreign Application Priority Data

Feb. 2, 1998 (JP) .......................................... 10-021137
Feb. 3, 1998 (JP) .......................................... 10-021947

(51) Int. Cl.[7] ............................. G06F 15/00; G06K 1/00
(52) U.S. Cl. ...................... 358/1.15; 358/1.1; 358/1.2; 358/1.3; 358/1.4; 358/1.5; 358/1.6; 358/1.7; 358/1.8; 358/1.9; 358/1.11; 358/1.12; 358/1.13; 358/1.14; 358/1.16; 358/1.17; 358/1.18
(58) Field of Search ................................ 358/1.15, 1.1, 358/1.2, 1.3, 1.4, 1.5, 1.6, 1.7, 1.8, 1.9, 1.11, 1.12, 1.13, 1.14, 1.16, 1.17, 1.18

(56) References Cited

U.S. PATENT DOCUMENTS

| | | | | |
|---|---|---|---|---|
| 5,625,757 A | * | 4/1997 | Kageyama et al. | ........ 358/1.14 |
| 5,767,985 A | * | 6/1998 | Yamamoto et al. | ......... 358/402 |
| 6,292,267 B1 | * | 9/2001 | Mori et al. | ................ 358/1.15 |
| 6,301,012 B1 | * | 10/2001 | White et al. | ................ 358/1.15 |
| 6,396,594 B1 | * | 5/2002 | French et al. | ............... 358/1.18 |

* cited by examiner

*Primary Examiner*—Edward Coles
*Assistant Examiner*—Ashanti Ghee
(74) *Attorney, Agent, or Firm*—Oliff & Berridge, PLC

(57) ABSTRACT

A print system has: a client apparatus for outputting print data; a printer server apparatus for receiving the print data from the client apparatus, and controlling an output of the print data received from the client apparatus in time; and a printer apparatus for receiving the print data from the printer server apparatus, converting the print data received from the printer server apparatus and printing the converted print data. The printer apparatus has a print property and converts and prints the print data received from the printer server apparatus according to the print property. The printer server apparatus has: a receiving device for receiving the print data from the client apparatus; a spooling device for temporarily storing the print data received by the receiving device; an output control device for controlling the output of the print data stored in the spooling device in time, depending on whether or not the printer apparatus is ready to receive the print data; a storage device for storing a printer description file in which information representing the print property of the printer apparatus is described; and an update device for updating the printer description file stored in the storage device when the print property of the printer apparatus is changed.

5 Claims, 8 Drawing Sheets

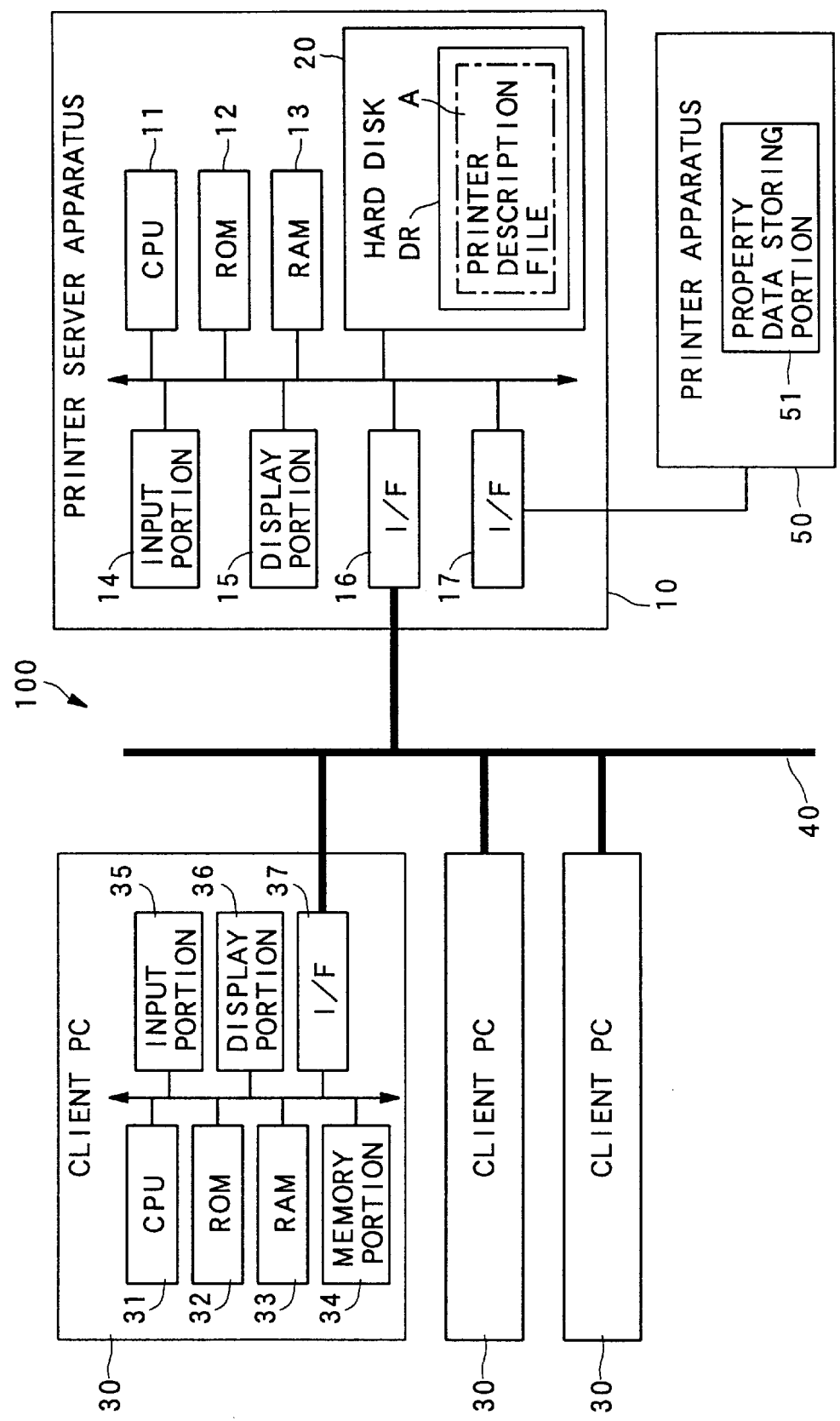

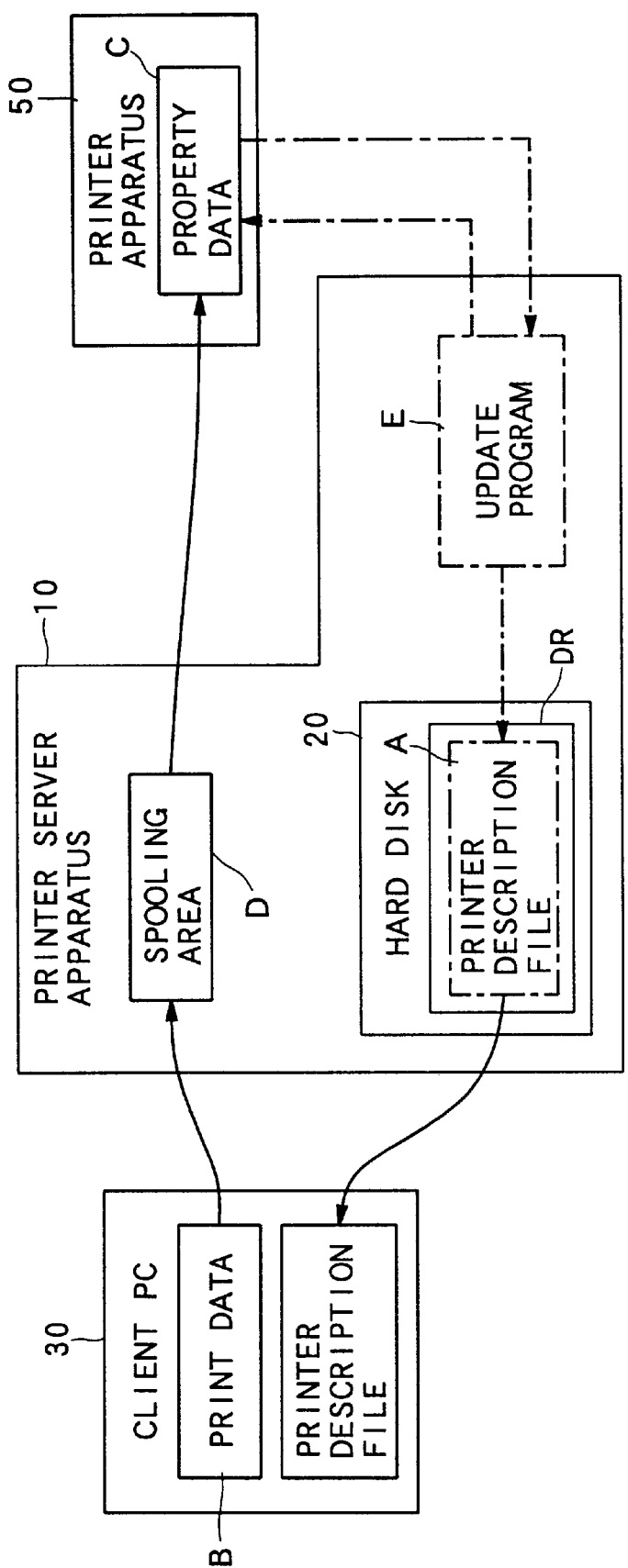

```
PrinterName:      XXXXXXXX
Version:          2.01
PaperSize: begin
      A4   [595 842]
      A3   [842 1191]
      A2   [1191 1684]
      A1   [1684 2384]
      A0   [2384 3370]
           end
FontList: begin
      ToubaiKyoukasho-90pv-RKSJ-H RKSJ 90pv
      KoukaMaruGothic-L-90pv-RKSJ-H RKSJ 90pv
      YosugiGothic-M-90pv-RKSJ-H RKSJ 90pv
      YosugiGothic-B-90pv-RKSJ-H RKSJ 90pv
      YosugiGothic-L-90pv-RKSJ-H RKSJ 90pv
      TenkaGyosho-90pv-RKSJ-H RKSJ 90pv
      WazaguraMincho-M-90pv-RKSJ-H RKSJ 90pv
      WazaguraMincho-B-90pv-RKSJ-H RKSJ 90pv
      ByogaPencho-90pv-RSKJ RSKJ 90pv
           end
EOF
```

PRINT SYSTEM

BACKGROUND OF THE INVENTION

1. Field of the Invention

The present invention relates to a print system consisting of a client apparatus, a printer server apparatus and a printer apparatus which are mutually connected through, for example, a communication network.

2. Description of the Related Art

A print system consists of a client apparatus such as a personal computer, a printer server apparatus and a printer apparatus. These constituent apparatuses are mutually connected through a network. In the print system of this type, the client apparatus boots, for example, a drawing software, a photo retouch software, or a word processor software, generates print data corresponding to a document or an image and outputs the resultant print data to the printer server apparatus. The printer server apparatus receives the print data output from the client apparatus and appropriately outputs the received print data to the printer apparatus depending on the processing state of the printer apparatus. The printer apparatus receives the print data output from the printer server apparatus, converts (or expands) and then prints out the received print data. If the print data is, for example, page description language data described in page description language, the printer apparatus converts the page description language data to bit-map data or the like and prints out the bit-map data.

Printing property is set to the printer apparatus. The printer apparatus converts print data according to its print property and prints it out. The print property is determined by print property information. The print property information involves, for example, applicable sizes of print paper, applicable fonts, applicable ink types, the number or range of applicable colors and property on conversion of page description languages.

These pieces of print property information are used by not only the printer apparatus itself but also the client apparatus. If, for example, the client apparatus generates print data or print data is output from the client apparatus to either the printer server apparatus or the printer apparatus, the print property information is used by a printer driver installed to the client apparatus or the application software such as the drawing software as stated above. This is because generating print data requires information on a print paper size, a font type and/or the number of ink colors.

For that reason, the print property information on the printer apparatus is stored in the printer apparatus and also supplied to the client apparatus. Specifically, the print property information is described in a printer description file and stored in a predetermined storing area in the client apparatus. In case of a printer apparatus which prints out print data described in, for example, PostScript language (where PostScript is a trademark of Adobe Systems Incorporated), the print property on the printer apparatus is described in a printer description file referred to as "PPD (PostScript Printer Description) file" and supplied to the client apparatus.

The print property used herein is an element specific to a printer apparatus. Owing to this, the print property information is normally preset in the printer apparatus and not supposed to be frequently changed. For instance, in a conventional printer apparatus, applicable print paper sizes have much to do with the hardware configuration of the printer apparatus and cannot be normally changed. Likewise, applicable fonts, ink types, the number of applicable colors and the like cannot be normally change unless part of the printer apparatus hardware is changed. Accordingly, no demand has arisen for updating the content of the printer description file.

Nevertheless, if consideration is given to environments where diversified print types are needed, it is necessary to enhance flexibility of a print system. It is also necessary to improve printing accuracy for every printed output. To meet such demand, it is of increasing necessity to change the print property of the printer apparatus according to various purposes and subjects for printing.

When the print property of the printer apparatus is changed, it is required to change the content of the printer description file stored in a predetermined storing area in the client apparatus. As stated above, however, demand for updating the printer description file have hardly risen in conventional print systems, so that no means have been proposed for automatically rewriting the content of the printer description file as the print property of the printer apparatus is changed.

In the conventional print system, a user is able to manually rewrite a printer description file stored in a predetermined storing area in a client apparatus. This is, however, laborious and less efficient.

Meanwhile, if there is provided means for communicating information between the client apparatus and the printer apparatus, the client apparatus can be notified of the change of the print property of the printer apparatus and allows the printer description file to be automatically changed. There are, however, cases where a spooler (or spooling device) is connected between a client apparatus and a printer apparatus, considering that the rate at which print data is output from the client apparatus to the printer apparatus is higher than that at which the printer apparatus performs print processing. In those cases, the spooler existing in the middle of a communication path from the client apparatus to the printer apparatus makes it difficult to communicate information between the client apparatus and the printer apparatus. Due to this, it is difficult to automatically change the printer description file.

SUMMARY OF THE INVENTION

It is therefore an object of the present invention to provide a print system capable of easily, automatically changing a print description file and enhancing efficiency in print operation.

The object can be achieved by a print system in accordance with the present invention. The print system has: a client apparatus for outputting print data; a printer server apparatus for receiving the print data from the client apparatus, and controlling an output of the print data received from the client apparatus; and a printer apparatus for receiving the print data from the printer server apparatus, converting the print data received from the printer server apparatus and printing the converted print data. The printer apparatus has a print property, and converts and prints the print data received from the printer server apparatus according to the print property. The printer server apparatus has: a print data receiving device for receiving the print data from the client apparatus; a spooling device for temporarily storing the print data received by the print data receiving device; an output control device for controlling the output of the print data stored in the spooling device, depending on whether or not the printer apparatus is ready to receive the print data; a storage device for storing a printer description file in which information representing the print property of the printer apparatus is described; and an updating device for updating the printer description file when the print property of the printer apparatus is changed.

In printing operation, the client apparatus outputs the print data to the printer server apparatus. In the printer server apparatus, the print data receiving device receives the print data, and then, the spooling device temporarily stores the received print data. Then, the output control device controls the output of the print data stored in the spooling device, depending on whether or not the printer apparatus is ready to receive the print data. Under the control of the output control device, the print data stored in the spooling device is sent to the printer apparatus. Then, the printer apparatus receives the print data, converts it, and prints it out. The printer apparatus has a print property, and performs the converting operation and printing operation according to the print property.

The printer server apparatus has a printer description file in which information representing the print property of the printer apparatus is described. The printer described file is stored in the storage device of the printer server apparatus. The printer server apparatus further has the updating device for updating the printer description file when the print property of the printer apparatus is changed. Accordingly, the print description file can be easily and automatically updated.

The updating device can recognize a changed printer property of the printer apparatus by communicating with the printer apparatus. To achieve an appropriate communication between the updating device and the printer apparatus, the updating device may has: a determining device for determining whether or not the print property of the printer apparatus is changed; a requesting device for outputting, to the printer apparatus, a request command to request the information representing the print property of the printer apparatus, when the determining device determines that the print property of the printer apparatus is changed; an information receiving device for receiving the information representing the print property of the printer apparatus from the printer apparatus, when the printer apparatus outputs the information representing the print property thereof in response to the request command; and a describing device for describing the received information of the print property of the printer apparatus into the printer description file.

Furthermore, the storage device may include a shared area which can be accessed by the client apparatus. In this case, the printer description file is stored in the shared area as a shared file. Therefore, the client apparatus can fetch the printer description file from the shared area of the storage device in the printer server apparatus. Accordingly, the printer description file stored in the client apparatus can be easily updated.

The above-mentioned object can be also achieved by another print system of the present invention. The print system has: a client apparatus for outputting print data; a printer server apparatus for receiving the print data from the client apparatus, converting the print data received from the client apparatus, and outputting the converted print data; and a printer apparatus for receiving the print data from the printer server apparatus, and printing the print data received from the printer server apparatus. The client apparatus has: a print data output device for outputting the print data to the printer server apparatus; and a property file output device for outputting, to the printer server apparatus, a property file in which property data to set a print property of the printer server apparatus and the printer apparatus is described. The printer server apparatus has: a print data receiving device for receiving the print data from the client apparatus; a spooling device for temporarily storing the print data received by the print data receiving device; a first storage device for receiving the property file from the client apparatus and storing the received property file therein; a second storage device for storing a printer description file in which designation information to designate the property file stored in the first storage device is described; a determining device for determining whether or not the property file is received by and added into the first storage device; and an updating device for updating the printer description file by adding the designation information to designate the added property file, when the determining device determines that the property file is received by and added into the first storage device.

In printing operation, the print data output device of the client apparatus outputs the print data to the printer server apparatus. In the printer server apparatus, the print data receiving device receives the print data, and the spooling device temporarily stores it. The print data is then converted in the printer server apparatus, and then sent from the printer server apparatus to the printer apparatus. Then, the print data is printed out by the printer apparatus.

The printer server apparatus has a property file in which property data to set a print property of the printer server apparatus and the printer apparatus is described. The property file is stored in the first storage device of the printer server apparatus. The printer server apparatus and the printer apparatus perform the conversion operation and printing operation according to the print property set by the property data described in the property file.

The printer server apparatus also has a print description file. Designation information to designate the property file stored in the first storage device is described in the print description file. The designation information is used for the client apparatus. For example, if several property files are stored in the first storage device, designation information to designate the respective several property files is described in the print description file. By referring the designation information described in the print description file, the client apparatus can select a desirable or necessary property file from among the several property files. The property file selected by the client apparatus is used for the conversion operation and printing operation in the printer server apparatus and the printer apparatus. Thus, the print property of the printer server apparatus and printer apparatus can be easily changed.

The property file can be added. Therefore, a new print property can be added to the printer server apparatus and printer apparatus. When a new property file is added, the property file output device outputs the property file to the printer server apparatus. Then, in the printer server apparatus, the first storage device receives the property file, and added it therein. The determining device of the printer server apparatus determines whether the property file is received and added into the first storage device. When the determining device determines so, the updating device updates the printer description file stored in the second storage device by adding the designation information to designate the new property file. Thus, the print description file can be easily and automatically updated, when the property file is supplied from the client apparatus to the printer server apparatus. Consequently, if the user only sends the new property file to the printer server apparatus by using the client apparatus, the print property can be easily added and the printer description file can be automatically updated.

Furthermore, if color edit data to be used for converting the print data in the printer server apparatus is described in the property file, a color property for the conversion process in the printer server apparatus can be easily added and the printer description file can be automatically updated.

Moreover, if font data for print characters is described in the property file, a new font can be easily added and the printer description file can be automatically updated.

Moreover, the first storage device of the printer server apparatus may include a shared area which can be accessed by the client apparatus, and the property file may be stored in the shared area. Therefore, the property file can be easily added by the client apparatus.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a block diagram showing a print system according to a first embodiment of the present invention;

FIG. 2 is a view showing an operation of the print system according to the first embodiment of the present invention;

FIG. 3 shows an example of a printer description file according to the first embodiment of the present invention;

DETAILED DESCRIPTION OF THE PREFERRED EMBODIMENTS

Figure 4:
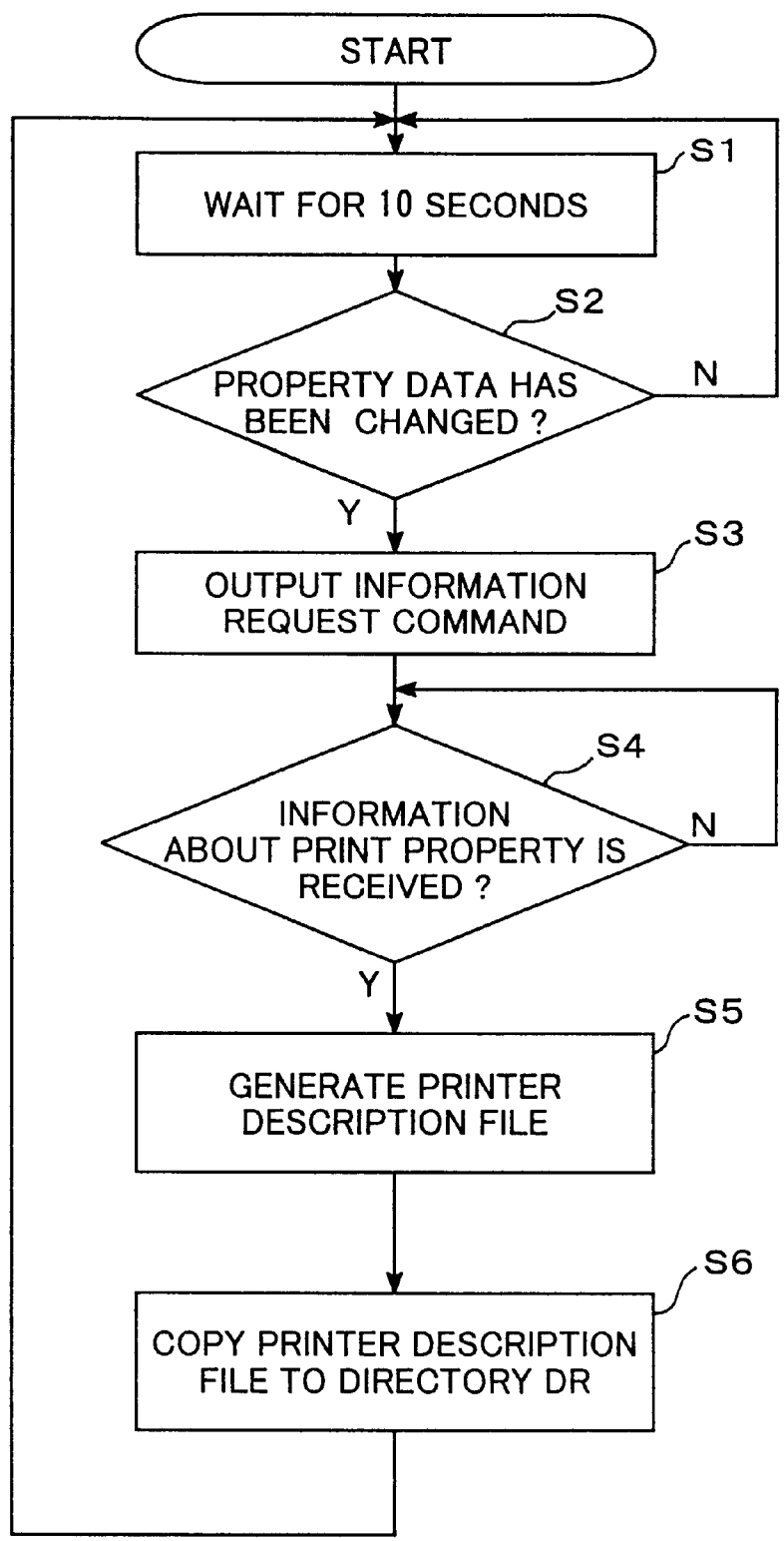
FIG. 4 is a flow chart showing processing for updating the printer description file according to the first embodiment of the present invention.

Now, embodiments of the present invention will be described with reference to the accompanying drawings.

I. First Embodiment

The first embodiment of the present invention will be described.

FIG. 1 is an overall block diagram showing a print system according to the present invention. As shown therein, a print system 100 includes a printer server apparatus 10, a plurality of client personal computers 30 (to be referred to simply as "client PCs 30" hereinafter) and a printer apparatus 50. The printer server apparatus 10 and each of the client PCs 30 are mutually connected through a communication network 40. The printer apparatus 50 is directly connected to the printer server apparatus 10.

The printer server apparatus 10 is constructed by a computer such as a personal computer and a workstation. The printer server apparatus 10 includes a CPU 11, an ROM 12, an RAM 13, an input portion 14, a display portion 15, a network interface (I/F) 16, a printer interface (I/F) 17 and a hard disk 20, which are mutually connected through a bus.

The CPU 11 controls the printer server apparatus 10. The CPU 11 controls the printer server apparatus 10 to spool print data output from the respective PCs 30 when print operation is executed. Specifically, the CPU 11 forms a storing area for use in spooling (to be referred to as "spooling area" hereinafter) in the RAM 13 and, if necessary, in the hard disk 20. The print data output from the client PCs 30 are temporarily stored in the spooling area. The CPU 11 monitors a state as to how data conversion processing (or expansion processing) and print processing are performed in the printer apparatus 50. When the printer apparatus 50 is ready to receive print data, the CPU 11 outputs the print data stored in the spooling area to the printer apparatus 50. This makes it possible to compensate for the difference between the output rate at which the client PC 30 outputs the print data to the printer apparatus 50 and the processing rate at which the printer apparatus 50 expands and prints out the print data. The spooling operation allows storing the print data output from the client PC 30 while the printer apparatus 50 is performing print processing. The print data herein involves image data, document data and the like generated using, for example, drawing software, photo retouch software and word processor software.

Further, the CPU 11 updates a print description file based on an update program shown in FIG. 4, as will be described later.

The ROM 12 stores a program for controlling the printer server apparatus 10,.an update program shown in FIG. 4 and other various data.

The RAM 13 serves as a spooling area while print processing is executed. The RAM 13 also serves as an operating area to generate a new printer description file to update the printer description file.

The input portion 14 is a device to input data or commands into the printer server apparatus 10 and consists of, for example, a keyboard, a mouse and/or a switch panel. The display portion 15 is a device to display characters, numeric values and images to confirm the data or commands input into the printer server apparatus 10 from the input portion 14 and to check the operation state of the printer server apparatus 10. The display portion 15 consists of, for example, a CRT display or a liquid crystal display.

The network interface 16 connects the printer server apparatus 10 to the communication network 40 and serves to control the input of data transmitted from the communication network 40 to the printer server apparatus 10 and the output of data transmitted from the printer server apparatus 10 to the communication network 40. The printer interface 17 serves to control the output of data transmitted from the printer server apparatus 10 to each of the printer apparatuses 50 and the input of data from each printer apparatus 50 to the printer server apparatus 10.

A directory DR is formed in the hard disk 20 to store a printer description file to be described later. The directory DR is shared among the respective client PCs 30. A user can, thus, access the directory DR through the user's client PC 30 and transfer (or copy) the printer description file stored within the directory DR to a memory portion 34 or the like in the client PC 30.

Next, description will be given to the printer apparatus 50. The printer apparatus 50 is connected to the printer server apparatus 10 through the printer interface 17. The printer apparatus 50 converts (or expands) print data output from the printer server apparatus 10 and prints the print data. For instance, the printer apparatus 50 converts the print data in page description language into bit-map data and prints the resultant bit-map data. The printer apparatus 50 is provided with a property data storing portion 51 consisting of a reloadable memory. The property data storing portion 51 stores property data which will be described later.

Although FIG. 1 illustrates that one printer apparatus 50 is connected to the printer server apparatus 10, the number of printer apparatuses 50 may be two or more. The printer apparatus 50 may be connected to the communication network 40 instead of connected to the printer server apparatus 10 through the print connection interface 17.

Each of the client PCs 30 includes a CPU 31, an ROM 32, an RAM 33, a memory portion 34, an input portion 35, a display portion 36 and a network interface 37. These constituents are mutually connected through a bus.

The CPU 31 controls the operation of the client PC 30. The ROM 32 stores a program for controlling the operation of the client PC 30 and the like. The RAM 33 serves as an operating area used while the CPU 31 executes the above program or the like. The memory portion 34 consists of a hard disk or the like and serves to input data and commands to the client PC 30. The display portion 36 consists of a CRT display, a liquid display or the like. The network interface 37 connects the client PC 30 to the communication network 40 and serves to control the input/output of data between the client PC 30 and the communication network 40. Each of the client PCs 30 is also provided with a disk drive to input/output data to/from a storing medium such as a floppy disk.

The memory portion 34 of the client PC 30 stores a printer driver. The memory portion 34 also stores application software such as word processor software, drawing software and photo retouch software. If the application software is executed by the CPU 31, the print data can be generated and/or output by the client PC 30. The memory portion 34 of the client PC 30 can store a printer description file, which file is supplied from the printer server apparatus 10.

Additionally, the client PC 30 can output a file stored in, for example, the memory portion 34 to the printer server 10 through the communication network 40. For instance, the client PC 30 can copy the print data (or print file) stored in a floppy disk to the memory portion 34 and output the print data thus copied to the printer server apparatus 10 through the communication network 40.

Although FIG. 1 illustrates that three client PCs 30 are connected to the communication network 40, the number of client PCs 30 may be one, two, four or more.

Next, description will be given to the property data stored in the property data storing portion 51 of the printer apparatus 50. The property data is data to set the print property for the print apparatus 50. The print property of the print apparatus 50 involves property in relation to print paper, fonts, print ink, the number or range of reproducible colors, expansion of the page description language. The property data involves numeric data, functional data, conversion formulae, a conversion control program and the like to set the properties. The printer apparatus 50 converts and prints the print data according to the print property set by the property data.

Next, description will be given to a printer description file stored in the hard disk 20 of the printer server apparatus 10. The printer description file means a file in which information about the print property of the printer apparatus 50, i.e., print property information is described. The print property information involves, for example, information indicating types and sizes of applicable print paper, that indicating the number or range of reproducible colors and that indicating types of expandable page description language. Referring now to FIG. 3, an example of the printer description file is shown. Information indicating paper sizes, a font list indicating fonts and the like which can be used by the printer apparatus 50 is described in the printer description file shown therein.

The printer description file is mainly utilized by the application software such as the above-cited drawing software and the printer driver if the client PC 30 generates print data or outputs the print data to the client server apparatus 10. This is because the print data cannot be generated or output to the client server apparatus 10 without using the print property of the printer apparatus 50. In the print system 100 in this embodiment, the printer description file stored in the hard disk of the printer server apparatus 10 is also held by the client PCs 30 by transferring the printer description file stored in the hard disk 20 of the printer server apparatus 10 to the memory portion 34 of the client PC 30.

Now, description will be given to the operation of the print system 100 if print processing is executed in this embodiment.

As shown in FIG. 2, if print processing is executed, the client PC 30 outputs print data B to the printer server apparatus 10. The printer server apparatus 10 receives the print data B output from the client PC 30 and temporarily stores this print data B into the spooling area D formed in the RAM 13 or hard disk 20. When the printer apparatus 50 is ready to receive the print data B, the printer server apparatus 10 outputs the print data B stored in the spooling region D to the printer apparatus 50. The printer apparatus 50 then receives the print data B output from the printer server apparatus 10, converts the print data B according to the print property set by the print data C and prints the converted data B.

Next, description will be given to printer description file update processing in this embodiment.

The print property of the printer apparatus 50 is changed when the printer apparatus 50 is replaced by a different printer apparatus or when the property data C stored in the property storing portion 51 of the printer apparatus 50 is changed (added, deleted or replaced). When a font cartridge is inserted into the printer apparatus 50 to thereby change font data, for example, the property on fonts of the printer apparatus 50 is changed. If so, the printer server apparatus 10 updates the printer description file A according to an update program E, as shown in FIG. 2.

Now, the update program for updating the printer description file will be described with reference to the flow chart of FIG. 4. When the printer server apparatus 10 is powered, the update program is executed by the CPU 11.

First, in step 1, the CPU 11 waits for 10 seconds. In step 2, the CPU 11 examines the property data of the printer apparatus 50 and determines whether or not the property data has been changed. If it is determined that the property data of the printer apparatus 50 has been changed, the CPU goes on to step 3. If it is determined that the property data of the printer apparatus 50 has not been changed, the CPU 11 re-executes the step 1. The CPU 11 repeatedly executes steps 1 and 2 until the property data is changed. By so doing, whether or not the property data is changed is checked at 10 seconds' intervals.

In step 3, the CPU 11 outputs an information request command to the printer apparatus 50 from the printer server apparatus 10 (see FIG. 2). The information request command is to request that information on the print property of the printer apparatus 50 be transmitted from the printer apparatus 50 to the printer server apparatus 10.

When receiving the information request command, the printer apparatus 50 extracts requested information from among the property data and outputs the extracted information to the printer server apparatus 10. The CPU 11 waits until the information is output from the printer apparatus 50 (in step 4). When the printer server apparatus 10 receives the information, the CPU 11 executes step 5.

In the step 5, the CPU 11 generates a new printer description file in which the received information, that is, information on the print property of the printer apparatus 50 is described. Next, in step 6, the CPU 11 copies the newly generated printer description file to the directory DR formed in the hard disk 20 of the printer server apparatus 10. As a result, the already existing, older printer description file is replaced by the newly generated printer description file. In other words, the printer description file is updated.

After the printer description file is updated, the user accesses the directory DR of the printer server 10 using the user's client PC 30. The user then transfers (or copies) the new printer description file stored in the directory DR to the memory portion 34 or the like of the client PC 30. Thus, the printer description file on the part of the client PC 30 is updated.

It is noted that the present invention should not be restricted to the above case. Whenever requiring information on print property, the client PC 30 can automatically access the directory DR within the printer server 10 and refer to the printer description file.

According to the print system 100 in this embodiment, it is possible to automatically update the printer description file as the print property of the printer apparatus 50 is changed. Accordingly, when the print property of the printer apparatus 50 is changed, the user does not need to manually rewrite the printer description file using, for example, a text editor. This can lessen a load on the user and improve print operating efficiency.

Moreover, since the printer description file is stored in the directory DR in the hard disk 20 of the printer server apparatus 10 and the directory DR is shared among the respective client PCs 30, each client PC 30 can easily acquire the printer description file through, for example, the communication network 40. It is, thus, possible to easily provide the latest printer description file updated in accordance with the change of the printer property of the printer apparatus 50 to the printer driver or the application software of the client PC 30.

This embodiment exemplifies a case where the printer description file is updated by examining change in the property data. The present invention, however, should not be limited to the case. If a printer head, a paper cassette or a font card is exchanged for a different one, for instance, the type of the printer head installed to the printer apparatus 50, that of the paper cassette or the font card may be checked and the printer description file may be thereby updated based on the result.

Additionally, the above-stated embodiment has been described, while taking a case where the printer server apparatus 10 and the printer apparatus 50 are provided independent of each other, as an example. The present invention should not be limited to the case. The printer server apparatus and the printer apparatus can be realized by providing a single apparatus having both a printer server function and a printer function.

II. Second Embodiment

Now, the second embodiment of the present invention will be described. In the first embodiment, the printer server apparatus 10 mainly acts as a spooler, whereas the printer apparatus 50 retains a function of converting the print data in, for example, page description language into bit-map data. In the second embodiment, by contrast, a printer server apparatus 210 functions not only as a spooler but as data conversion means for converting print data in, for example, page description language into bit-map data. In this embodiment, a printer apparatus 250 lacks data conversion means.

In the first embodiment, since the printer apparatus 50 has the data conversion means as stated above, the property data to define print property is stored in the printer apparatus 50. In the second embodiment, since the printer server apparatus 210 has the data conversion means, the property data is described in a property file and stored in the printer server apparatus 210.

Furthermore, in conventional printer apparatuses, since the print property is an element specific to a printer apparatus, only one set of property data to define the print property is given to a printer apparatus. In the printer system of the second embodiment, by contrast, plural sets of property data are given to the printer server apparatus 210 as a plurality of property files. Thus, various printing operations can be performed by the printer server apparatus 210 and printer apparatuses 250. If a printing operation is actually performed, one of the property files is selected by the user through the client PC 30, as will be described later.

Moreover, in the first embodiment, if the property data of the printer apparatus 50 is updated, the printer server apparatus 10 updates the printer description file. In the second embodiment, if a new property file is transmitted from a client PC 30 to the printer server apparatus 210, the printer server apparatus 210 updates the printer description file.

Figure 5:
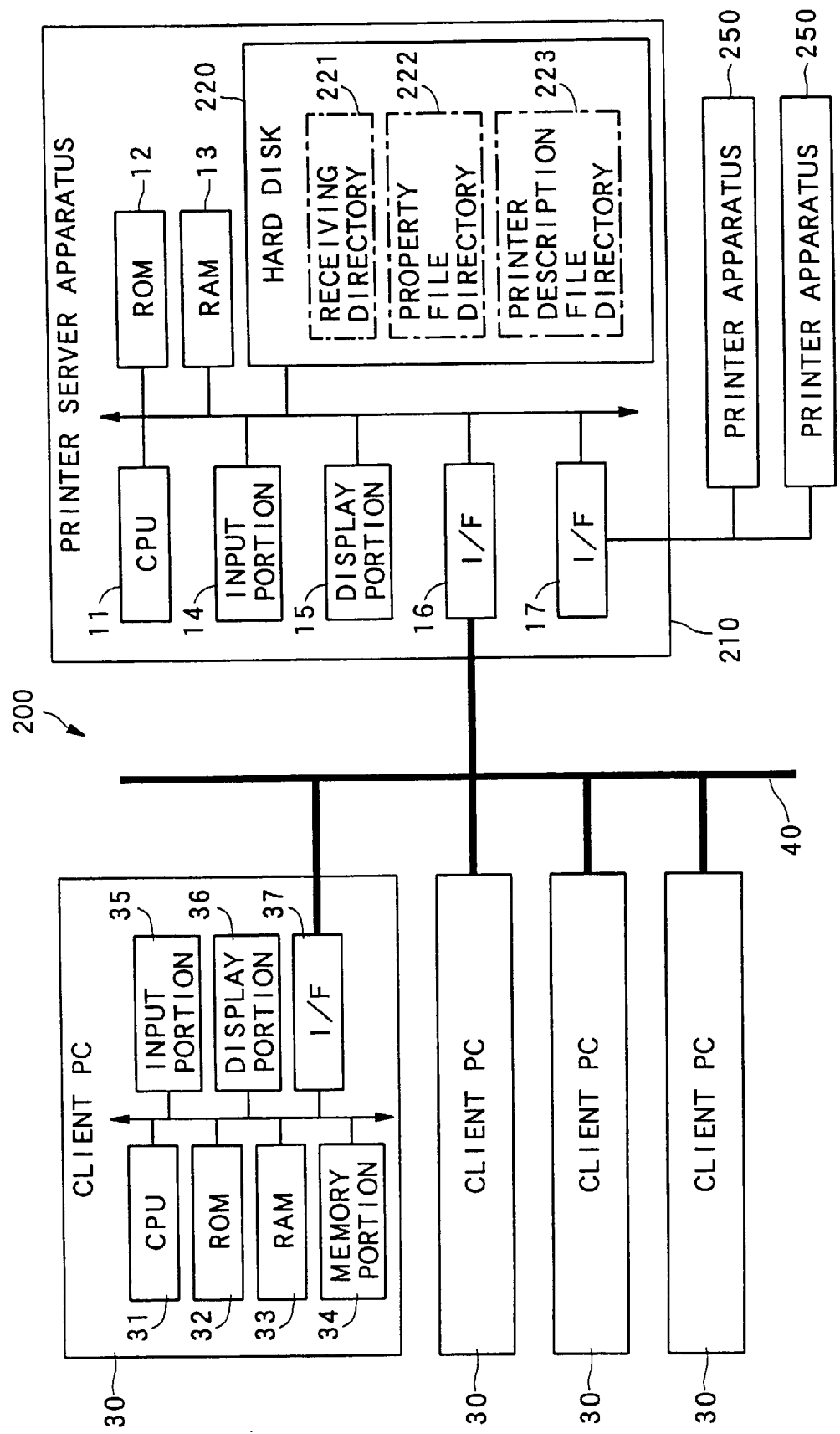
FIG. 5 is a block diagram showing a print system according to a second embodiment of the present invention.

FIG. 5 shows an overall structure of the print system 200 in the second embodiment according to the present invention. In FIG. 5, the same constructional elements as those in FIG. 1 carry the same reference numbers, and explanations about the constructional elements are omitted.

As shown in FIG. 5, the print system 200 includes a printer server apparatus 210, a plurality of client personal computers 30 (to be referred to simply as "client PCs 30" hereinafter). The printer server apparatus 210 and the client PCs 30 are mutually connected through a communication network 40.

The printer server apparatus 210 consists of a computer such as a personal computer and a workstation. The printer server apparatus 210, as in the case of the printer server apparatus 10 in the first embodiment, includes a CPU 11, an ROM 12, an RAM 13, an input portion 14, a display portion 15, a network interface 16 and a printer interface 17. The printer server apparatus 210 also includes a storing portion 220. The elements of the printer server apparatus 210 are mutually connected through a bus. To the printer server apparatus 210, a plurality of printer apparatuses 250 are connected through the printer interface 17.

The CPU 11 controls the printer server apparatus. While print processing is executed, the CPU 11 converts print data included in the print file output from a client PC 30 into bit-map data in a data format dependent on a printer apparatus. The print data is described in, for example, page description language.

Figure 6:
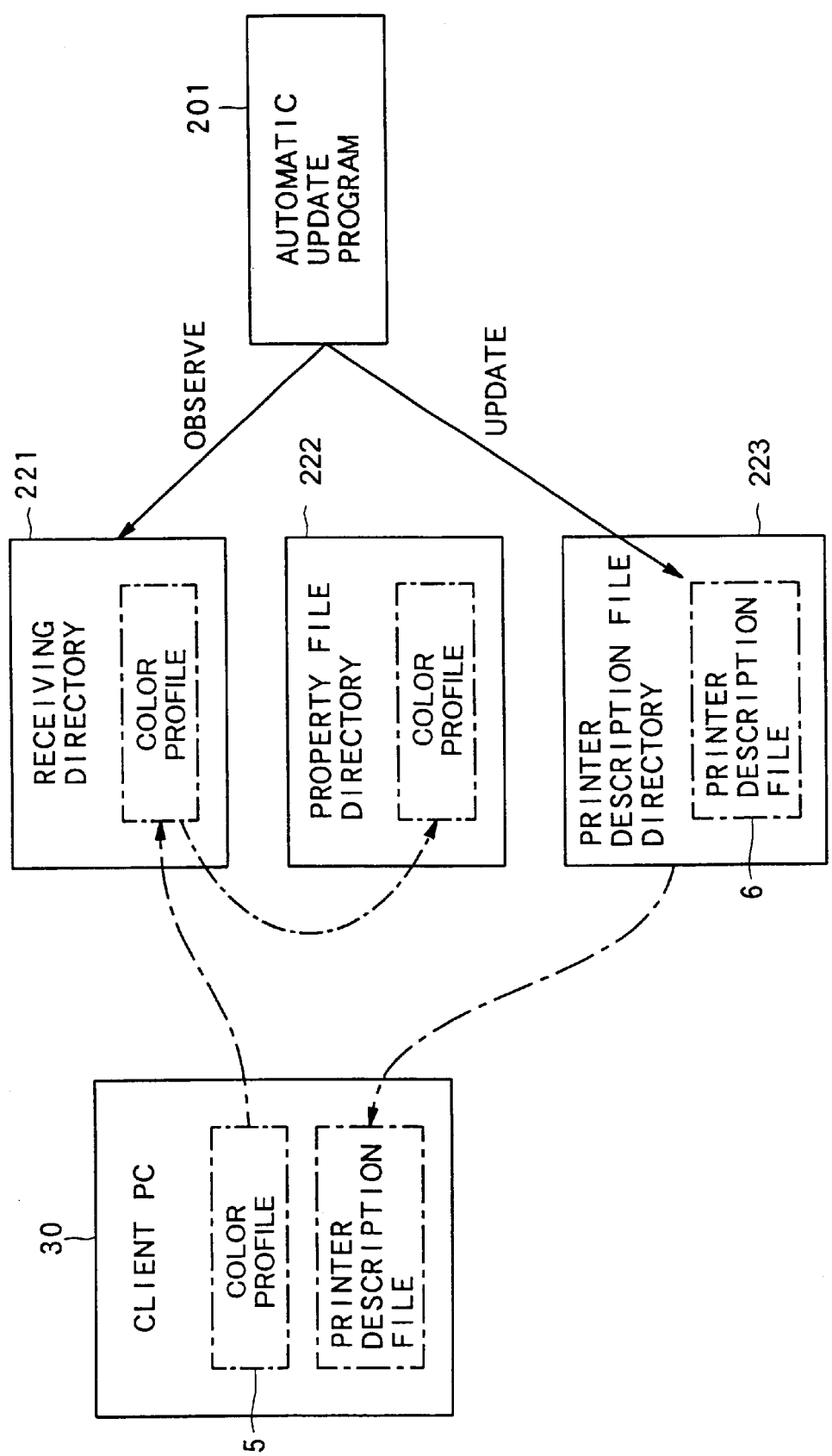
FIG. 6 is a view showing an operation of the print system if a property file is added to the print system according to the second embodiment of the present invention.
Figure 8:
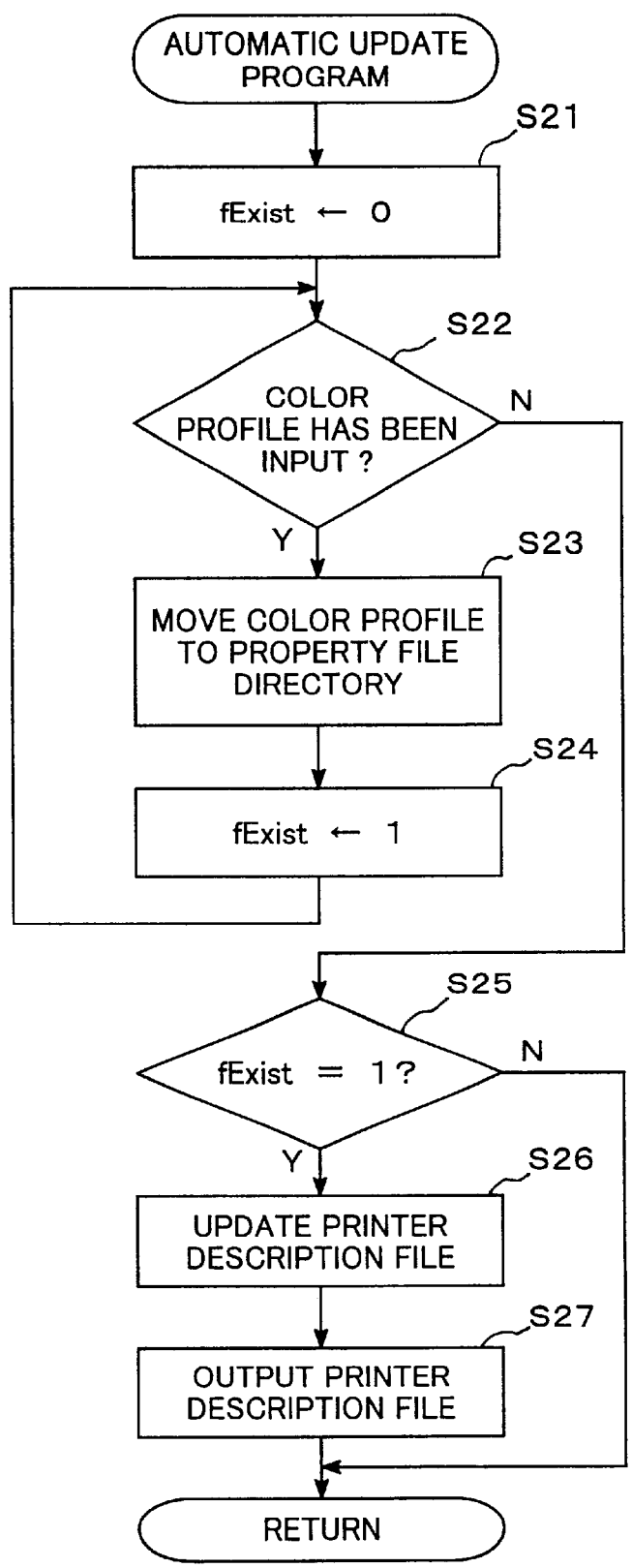
FIG. 8 is a flow chart showing the processing of an automatic update program to automatically update the print description file in the print system according to the second embodiment of the present invention.

The ROM 12 stores a main program and an automatic update program shown in FIGS. 6 and 8. The ROM 12 also stores a program for converting print data into bit-map data, a program for controlling the printer server apparatus 210 in the block and other various data. The RAM 13 is used as a working area and a spooling area.

The storing portion 220 consists of, for example, a reloadable memory such as an RAM and a hard disk. The storing portion 220 also retains a memory management function including, for example, the generation and setting of a directory (a storing area or a folder). A receiving directory 221, a property file directory 222 and a printer description file directory 223 are formed in the storing portion 220. The receiving directory 221 is a storing area to receive and temporarily store property files output from the client PCs 30. The property file directory 222 is a storing area to store a plurality of property files. The printer description directory 223 is a storing area to store printer description files.

The receiving directory 221 is shared among the respective client PCs 30. A user, thus, can see the receiving directory 221 on his or her client PC 30.

The property file means a file in which property data is described. The property data means data for setting the print property of the printer server apparatus 210 and that of the printer apparatus 250. The print property of the printer server apparatus 210 and that of the printer apparatuses 250 involve properties on print paper size, fonts, print ink, the number or range of reproducible colors, conversion of page description language and the like. The property data involves numeric data, functional data, conversion formulae, a conversion control program and the like to set these properties.

Now, there are some types of property files. For example, there are at least three types of property files, namely, color profiles, font files and function files.

The color profile means a file in which color edit data is described. The color edit data is data to edit or correct the difference in colors due to difference in the type of the display portion 36 of the client PC 30 and the type of ink or print paper used in the printer apparatus 250. If a drawing software, a photo retouch software or the like is booted on the client PC 30 for image editing, for example, and the display portion 36 of the client PC 30 differs from the printer apparatus 250 in color reproduction range, then colors of an image displayed on the display portion 36 of the client PC 30 differs from those of an image printed by the printer apparatus 250. In that case, the image colors displayed on the display portion 36 of the client PC 30 is matched to those printed by the printer apparatus 250 based on the color edit data described in the color profile.

The font file means a file in which font data is described. The font data is data to determine the font of characters in conversion of character data into bit-map data.

The function file means a file in which other property data is described, such as data with respect to print paper size, conversion of page description language, etc.

The printer description file means an information description file in which information on the print property of the printer server apparatus 210 and that of the printer apparatus 250 and the like are described. The information involves, for example, that on printable paper sizes and on convertible page description language. If a plurality of printer apparatuses 250 are connected to the printer server apparatus 210, names of the apparatuses 250 are listed in the printer description file.

Furthermore, the printer description file lists designation information for designating the respective color profiles and font files stored in the property file directory 222 in the printer server apparatus 210. The information is, for example, names of the respective color profiles and font files stored in the property file directory 222. The printer description file is referred to by the client PCs 30 at the time of generating print data.

In addition, it should be noted that the printer description file and the function file are different from each other. The printer description file is used to provide the client PCs 30 with the information with respect to the printable paper sizes, convertible page description language and designation information for designating the respective color profiles and font files stored in the property file directory 222. In contrast, the function file is used for converting operation and printing operation in the printer server apparatus 210 and the printer apparatuses 250 themselves.

Each of the printer apparatuses 250 connected to the printer server 210 through the printer interface 17 functions as a print engine to actually print the bit-map data output from the printer server apparatus 210 on paper. FIG. 5 shows that two printer apparatuses 250 are connected to the printer server apparatus 210. The number of the printer apparatuses 250 may be changed to, for example, one, three or more. In addition, the printer apparatus(es) 250 may be connected to the communication network 40 instead of not connected to the printer server apparatus through the printer interface 17.

Now, the client PCs 30 will be described. Each of the client PCs 30 includes a CPU 31, an ROM 32, an RAM 33, a memory portion 34, an input portion 35, a display portion 36 and a network interface 37, which are mutually connected through a bus. The memory portion 34 of the client PC 30 stores a printer driver. The memory portion 34 also stores application software such as word processor software, drawing software and photo retouch software. The memory portion 34 further stores a printer description file, which is supplied from the printer server apparatus 210.

Description will now be given to the operation of the print system 200 from the generation of print data to the execution of print processing in the second embodiment according to the present invention.

The print data is generated by a client PC 30 and output, as a print file, to the printer server apparatus 210 through the communication network 40. A print file which has been generated in advance and stored in a floppy disk or the like may be fetched by the client PC 30 through a disk drive or the like provided in the client PC 30 and output to the printer server apparatus 210 from the client PC 30 through the communication network 40.

If print data is generated by the client PC 30, an application software such as a word processor software, a drawing software and a photo retouch software stored in the memory portion 34 is booted and print data is generated using the application software. At this moment, the printer description file is used by the client PC 30. The user designates a color profile and/or a font file to set color edit data and/or font data at the time of generating print data. Then, the client PC 30 refers to the print description file and reads the designation information described in the print description file. As stated above, the designation information is, for example, names of the respective color profiles and font files stored in the property file directory 222 in the printer server apparatus 210. Then, the names of the respective color profiles and font files are displayed on the display portion 36 of the client PC 30. With this, the user can operate the input portion 35 while looking at the display portion 36 and designate a desired color profile and/or font file among those stored in the property file directory 222 in the printer server apparatus 210. For example, if the user intends to conduct color edit before the print data is printed out, then the user can designate a desired color profile among those stored in the property file directory 222 in the printer server apparatus 210. The information as to which color profile and/or font file the user designates is described in the print file. More concretely, data representing the name(s) of the designated color profile and/or font file is added to the print file.

The print description file is transmitted from the printer server apparatus 210 to the client PC 30 through the communication network 40 and stored in the memory portion 34 of the client PC 30 while the print system 200 is booted or the printer description file is updated.

After the print file has been generated, it is output from the client PC 30. The print file output from the client PC 30 is received by the printer server apparatus 210 through the communication network 40. The printer file is temporarily stored in the spooling area in the printer sever apparatus 210, and next, the printer server apparatus 210 converts the print data included in the print file into bit-map data. At this time, the printer server apparatus 210 designates the color profile and/or font file stored in the property file directory 222 in accordance with the information on the user's designation of the color profile and/or font file. The printer server apparatus 210 then sets print property in accordance with the color edit data and/or font data described in the designated color profile and/or font file. In addition, other print property is set according to the property data described in the function file. The printer server apparatus 210 then converts the print data into bit-map data in accordance with the set print property. The bit-map data is output from the printer server apparatus 210 to the printer apparatus 250 and is printed from the printer apparatus 250.

Next, description will be given to the operation of the print system 200 if a color profile is added in the second embodiment with reference to FIG. 6.

If a new color profile is added to the property file directory 222 in the printer server 210, the printer server 210 updates the printer description file by adding designation information to designate the newly added color profile. It is, thus, possible to designate the newly added color profile when print data is generated on the client PC 30. It is also possible to convert and print the print data using the color edit data described in the newly added color profile by the printer server apparatus 210 and the printer apparatus 250 when print processing is executed.

More specifically, as shown in FIG. 6, if a new color profile 5 is added to the property file directory 222 in the printer server apparatus 210, the client PC 30 outputs the color profile 5 to the client server apparatus 210 through the communication network 40. Then, the client server apparatus 210 receives the new color profile 5 and temporarily stores it in the receiving directory 221. During this time, the CPU 11 of the printer server apparatus 210 monitors whether or not a new color profile 5 is input into the receiving directory 221 based on the automatic update program 201. If the new color profile 5 is input into the receiving directory 221, the CPU 11 moves this color profile 5 to the property file directory 222. The CPU 11 then updates the printer description file by adding designation information to designate the new color profile 5, such as the name of the color profile 5, to the printer description file 6 stored in the printer description directory 223.

Thereafter, the CPU 11 outputs the updated printer description file 6 to each of the client PCs 30 from the printer server apparatus 210. Each client PC 30 receives the printer description file 6 and stores it in the memory portion 34. The printer description file 6 is stored in the same directory as that in which the printer driver is stored. It is, thus, possible for either the printer driver of the client PC 30 or the application software to generate print data to use the updated printer description file 6.

Next, description will be given to processing executed by the printer server apparatus 210 if a color profile is added, in accordance with the flow charts of FIGS. 7 and 8.

Figure 7:
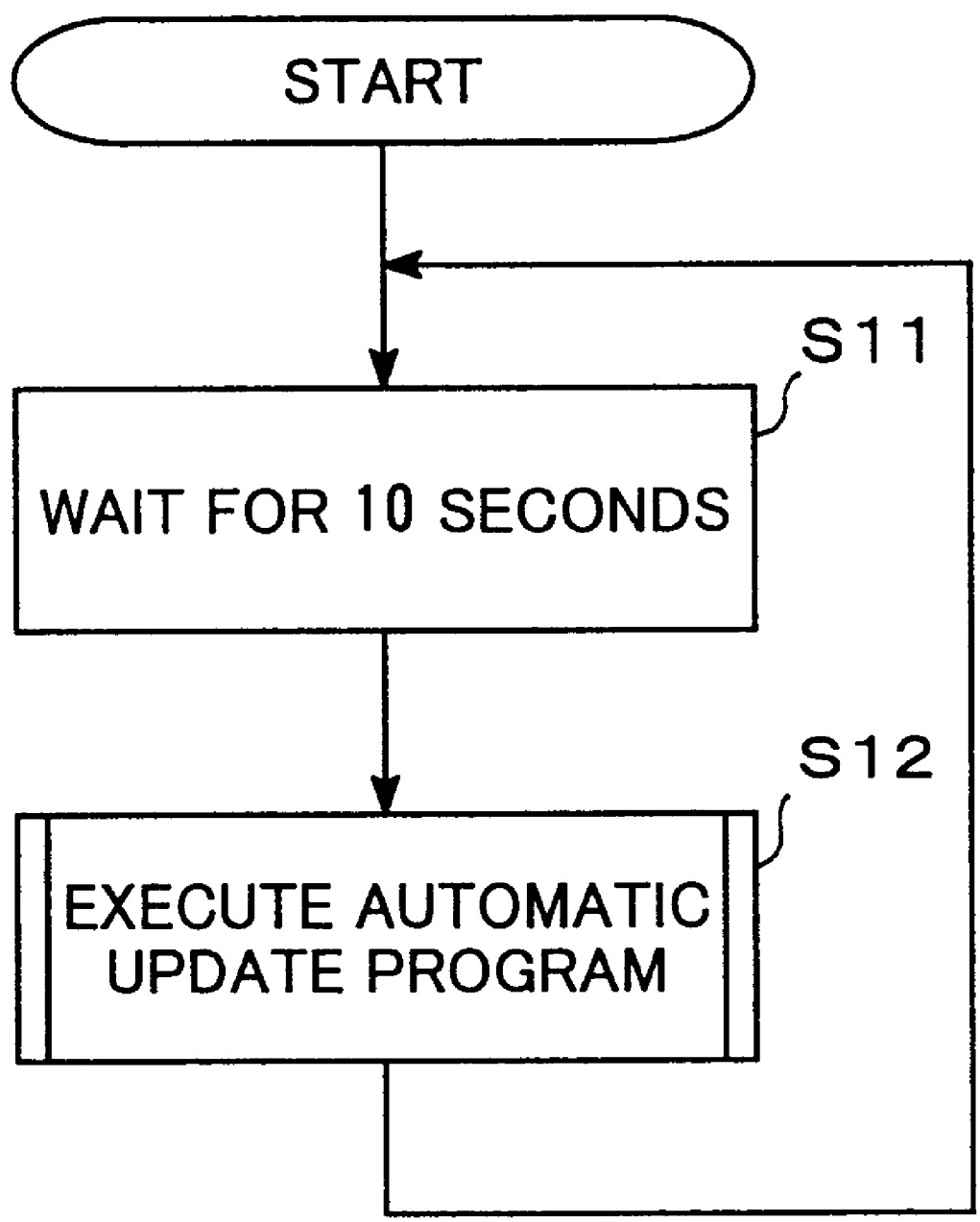
FIG. 7 is a flow chart showing the processing of a main program to add the property file in the print system according to the second embodiment of the present invention.

While the power is on, the CPU 11 of the printer server 210 executes the main program shown in FIG. 7. That is, in step 11 shown in FIG. 7, the CPU 11 waits for 10 seconds. In step 12, the CPU 11 boots the automatic update program shown in FIG. 8.

In step 21 of FIG. 8, the CPU 11 stores '0' in a flag fExist used to indicate whether or not a new color profile is stored in the property file directory 222 in order to initialize the flag fExist.

In step 22, the CPU 11 determines whether or not a color profile has been input to the receiving directory 221. The determination procedure is executed at least once every time the automatic update program is booted. The automatic update program is booted by the main program at 10 seconds' intervals. The procedure is, therefore, executed at least once in 10 seconds.

If the color profile is input to the receiving directory 221, the CPU 11 determines "YES" in step 22 and goes on to step 23. In the step 23, the CPU 11 moves the color profile input from the receiving directory 221 to the property file directory 222. In step 24, the CPU 11 stores '1' in the flag fExist. The process is then returned to the step 22. If a plurality of color profiles are stored in the receiving directory 221, the steps 22 to 24 are repeated until all of the color profiles stored in the receiving directory 221 are moved to the property file directory 222.

In the meantime, if no color profile is not input to the receiving directory 221 or all of the color profiles stored in the receiving directory 221 are moved to the property file directory, the CPU 11 determines "NO" in the step 22 and then goes on to step 25.

In the step 25, the CPU 11 determines whether or not the flag fExist is '1'. If it is determined that the flag fExist is '1', it means that a new color profile has been input to the receiving directory 221. The CPU 11, therefore, updates the printer description file by adding the name of the newly input color profile to the print description file in step 26.

In step 27, the CPU 11 outputs the printer description file thus updated to each of the client PCs 30 from the printer server apparatus 210. The updated printer property is stored in the memory portion 34 of each client PC 30 in which the printer driver is stored. Thereafter, process returns to the main program.

If the flag fExist is not '1', it means that a new color profile has not been input to the receiving directory 221. The CPU 11, therefore, does not update the printer description file. Process then returns to the main program.

In addition, if a font file is added, the print system 200 performs the same operation. Actually, either of a color profile and font file is added, the printer description file is updated in the above. Of course, both of a color profile and font file are added, the printer description file is updated. Moreover, the printer description file may be updated if a function file is added.

According to the print system 200 in the second embodiment, the user can add a property file only by outputting the new property file from the client PC 30 to the printer server apparatus 210. This makes it possible to store the new property file in the property file directory 222 and, at the same time, to automatically update the printer description file. Due to this, there is no need to manually rewrite the printer description file using, for example, a text editor. This can lessen the load on the user and enhance operating performance. In other words, the user can automatically add the property file and update the printer description file only with the operation of the client PC 30 on hand. The user can also promptly and easily add or change print properties which can be designated.

If a color profile or, in particular, is added to the printer server apparatus 210, all the user needs is to output a color profile from the client PC 30. By so doing, it is possible to store this color profile in the property file directory 222 in the printer server apparatus 210 and to automatically update the printer description file. Accordingly, it is possible to easily add or change the print properties which can be designated in regard to color edit.

Since the receiving directory 221 of the client server apparatus 10 is shared among all of the client PCs 30, users can see the receiving directory 221 on their client PCs 30, respectively. Thus, a user can easily transmit the property file from the client PC 30 to the receiving directory 221 in the printer server apparatus 210 only by copying the property file to the receiving directory which the user can see on the client PC 30 while operating the input portion 35.

In the above-stated second embodiment, description has been given while taking, as an example, a case where the print data included in the print file output from the client PC 30 is converted into bit-map data by the printer server 210. The present invention, however, should not be limited to the case. The print data included in the print file output from the client PC 30 may be output to the printer apparatus 250 through the printer server apparatus 210 and converted into the bit-map data by the printer apparatus 250. Besides, the second embodiment exemplifies bit-map data as data in a data format dependent on the printer apparatus 250; however, the present invention should not be limited thereto.

In the second embodiment, description has been given while taking, as an example, a case where the printer server apparatus 210 and the printer apparatus(es) 250 are independent of each other. The present invention should not be limited thereto and a single apparatus having both the printer server function and the printer function (or print engine function) may be provided.

Furthermore, in the second embodiment, description has been given while taking, as an example, a case where the designation information described in the printer description file is the name of the property file. The present invention, however, should not be limited thereto. For instance, description briefly indicative of the content of the property file may be given to the printer description file and the description is associated with the property file. To be specific, if the property file is, for example, a color profile describing color edit data for printing print data on ordinary copy paper, "color edit for ordinary copy paper" may be described in the printer description file and the description "color edit for ordinary copy paper" may be associated with the property file.

Moreover, in the second embodiment, description has been given while taking, as an example, a case where the printer description file is transmitted from the printer server apparatus 210 to a client PC 30 and is thereby stored in the client PC 30. The present invention, however, should not be limited thereto. The printer description file may be written from the printer server apparatus 210 to a floppy disk or the like and the printer description file thus written into the floppy disk is read by the client PC 30.

Additionally, in the second embodiment, description has been given while taking, as an example, a case where a property file is newly added to the printer server 210 and then designation information to designate the newly added property file is added to the printer description file. The present invention, however, should not be limited thereto. The printer description file may be re-generated so as to include designation information to designate a newly added property file.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 10-021137 filed on Feb. 2, 1998 and No. 10-021947 filed on Feb. 3, 1998 each including the specification, claims, drawings and summary are incorporated herein by references in their entirety.

What is claimed is:

1. A print system comprising: a client apparatus for outputting print data; a printer server apparatus for receiving the print data from the client apparatus, converting the print data received from the client apparatus, and outputting the converted print data; and a printer apparatus for receiving the print data from the printer server apparatus, and printing the print data received from the printer server apparatus, wherein the client apparatus comprises:

a print data output device for outputting the print data to the printer server apparatus; and a property file output device for outputting, to the printer server apparatus, a property file in which property data to set a print property of the printer server apparatus and the printer apparatus is described, and the printer server apparatus comprises:

a print data receiving device for receiving the print data from the client apparatus;

a spooling device for temporarily storing the print data received by the print data receiving device;

a first storage device for receiving the property file from the client apparatus and storing the received property file therein;

a second storage device for storing a printer description file in which designation information to designate the property file stored in the first storage device is described;

a determining device for determining whether or not the property file is received by and added into the first storage device; and an updating device for updating the printer description file by adding the designation information to designate the added property file, when the determining device determines that the property file is received by and added into the first storage device;

wherein the property data that sets the print property is independent of print status and includes at least one of paper size, fonts, print ink and color edit data, the print status including at least one of stopping status, printing status, print requesting status and error status;

wherein at least color edit data to be used for converting the print data in the printer server apparatus is described in the property file;

wherein the color edit data is data to edit variation caused by ink to be used in the printer apparatus or a print sheet to be used in the printer apparatus.

2. The system according to claim 1, wherein at least font data for print characters is described in the property file.

3. The system according to claim 1, wherein the first storage device has a shared area which can be accessed by the client apparatus, and the property file is stored in the shared area.

4. The system according to claim 1, wherein the printer server apparatus and the printer apparatus are integrated with each other as a single apparatus.

5. The system according to claim 1, wherein the client apparatus and the printer sever apparatus are connected with each other through a communication network.

* * * * *